(12) United States Patent
Ishihara et al.

(10) Patent No.: US 10,270,077 B2
(45) Date of Patent: Apr. 23, 2019

(54) NON-AQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Yuya Ishihara, Miyoshi (JP); Akihiro Ochiai, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/216,769

(22) Filed: Jul. 22, 2016

(65) Prior Publication Data
US 2017/0069894 A1 Mar. 9, 2017

(30) Foreign Application Priority Data

Sep. 7, 2015 (JP) .................. 2015-175613

(51) Int. Cl.
| | |
|---|---|
| *H01M 2/18* | (2006.01) |
| *H01M 2/16* | (2006.01) |
| *H01M 4/04* | (2006.01) |
| *H01M 4/131* | (2010.01) |
| *H01M 4/50* | (2010.01) |
| *H01M 4/505* | (2010.01) |
| *H01M 4/52* | (2010.01) |
| *H01M 4/525* | (2010.01) |
| *H01M 4/62* | (2006.01) |
| *H01M 4/66* | (2006.01) |
| *H01M 10/04* | (2006.01) |

(Continued)

(52) U.S. Cl.
CPC ........... *H01M 2/18* (2013.01); *H01M 2/1653* (2013.01); *H01M 2/1673* (2013.01); *H01M 2/1686* (2013.01); *H01M 4/043* (2013.01); *H01M 4/0404* (2013.01); *H01M 4/131* (2013.01); *H01M 4/502* (2013.01); *H01M 4/505* (2013.01); *H01M 4/523* (2013.01); *H01M 4/525* (2013.01); *H01M 4/623* (2013.01); *H01M 4/625* (2013.01); *H01M 4/661* (2013.01); *H01M 10/0431* (2013.01); *H01M 10/0525* (2013.01); *H01M 10/4235* (2013.01); *H01M 4/0435* (2013.01); *H01M 4/366* (2013.01); *H01M 10/052* (2013.01)

(58) Field of Classification Search
None
See application file for complete search history.

(56) References Cited

U.S. PATENT DOCUMENTS

| | | | |
|---|---|---|---|
| 2010/0009249 A1 | 1/2010 | Tojo et al. | |
| 2014/0178741 A1* | 6/2014 | Hasegawa | C08J 7/047 429/144 |

FOREIGN PATENT DOCUMENTS

| | | |
|---|---|---|
| CN | 103718338 A | 4/2014 |
| JP | 2002-367587 A | 12/2002 |

(Continued)

*Primary Examiner* — Tracy M Dove
(74) *Attorney, Agent, or Firm* — Sughrue Mion, PLLC

(57) ABSTRACT

A non-aqueous electrolyte secondary battery includes: a positive electrode plate; a negative electrode plate; and a separator disposed between the positive electrode plate and the negative electrode plate. The separator includes a porous resin layer. The porous resin layer is made of polyolefin having a melting point of 80° C. or more and 135° C. or less. At least one of the positive electrode plate and the negative electrode plate has a surface facing the porous resin layer. The surface forms a contact angle of 30° or more with a molten droplet of the polyolefin.

4 Claims, 11 Drawing Sheets

(51) Int. Cl.
*H01M 10/0525* (2010.01)
*H01M 10/42* (2006.01)
H01M 4/36 (2006.01)
H01M 10/052 (2010.01)

(56) References Cited

FOREIGN PATENT DOCUMENTS

JP 2013-046998 A 3/2013
WO 2008/044761 A1 4/2008

* cited by examiner

NON-AQUEOUS ELECTROLYTE SECONDARY BATTERY

This nonprovisional application is based on Japanese Patent Application No. 2015-175613 filed on Sep. 7, 2015, with the Japan Patent Office, the entire contents of which are hereby incorporated by reference.

BACKGROUND OF THE INVENTION

Field of the Invention

The present invention relates to a non-aqueous electrolyte secondary battery.

Description of the Background Art

WO2008/044761 discloses a separator having a shutdown function and forming a contact angle of 40° or less with an electrolyte solution.

SUMMARY OF THE INVENTION

The separator serves as an isolator preventing contact between a positive electrode plate and a negative electrode plate, and allowing charge carriers (typically, lithium ions) to penetrate therethrough. Furthermore, the separator also serves as a liquid holding material holding an electrolyte solution in internal cavities.

WO2008/044761 discloses a separator having a shutdown function. According to the shutdown function, when the battery temperature excessively rises, for example, due to abnormal use situations such as overcharge, a separator material melts, thereby shutting pores inside the separator, so that ion permeation is blocked.

According to the disclosure in WO2008/044761, the separator having the above-described shutdown function is configured such that the contact angle of the electrolyte solution with the separator surface is set to be small, so that the electrolyte solution can be readily held in the separator, thereby improving the battery performance.

However, the following points need to be further improved. Specifically, during overcharge, the high temperature state may be maintained even after the separator carries out the shutdown function. In this case, melting of the separator progresses, thereby causing the molten separator to permeate from the surface of the electrode plate (a positive electrode plate or a negative electrode plate) into the electrode plate. As a result, the separator is reduced in thickness, so that the positive electrode plate and the negative electrode plate may come into contact with each other.

The present invention has been made in light of the above-described problems. Namely, an object of the present invention is to provide a non-aqueous electrolyte secondary battery with improved overcharge resistance characteristics.

[1] A non-aqueous electrolyte secondary battery includes: a positive electrode plate; a negative electrode plate; and a separator disposed between the positive electrode plate and the negative electrode plate. The separator includes a porous resin layer. The porous resin layer is made of polyolefin having a melting point of 80° C. or more and 135° C. or less. At least one of the positive electrode plate and the negative electrode plate has a surface facing the porous resin layer. The surface forms a contact angle of 30° or more with a molten droplet of the polyolefin.

In the configuration of [1] described above, the porous resin layer made of polyolefin performs a shutdown function. Specifically, when the temperature inside the battery reaches 80° C. or higher, polyolefin melts, thereby shutting pores inside the porous resin layer, so that ion permeation is blocked.

After that, when the high temperature state is maintained, the molten polyolefin is to permeate through an electrode plate facing the porous resin layer (at least one of the positive electrode plate and the negative electrode plate). In the configuration of [1] described above, however, the electrode plate facing the porous resin layer has a solid surface that hardly gets wet by a polyolefin melt. In other words, the surface of the electrode plate facing the porous resin layer forms a contact angle of 30° or more with a molten droplet of polyolefin. In this case, the contact angle is an indicator showing wetting resistance. Thus, the greater the contact angle is, the more the surface of the electrode plate is likely to repel molten polyolefin. According to the present inventors' study, the contact angle between the molten droplet of polyolefin and the surface of the electrode plate is adjusted to be 30° or more, so that the molten polyolefin can be remarkably suppressed from permeating through the electrode plate. Consequently, the molten polyolefin is held between the positive electrode plate and the negative electrode plate, thereby lowering the possibility that the positive electrode plate and the negative electrode plate come in contact with each other.

It is to be noted that the melting point of polyolefin forming a porous resin layer should be set at 135° C. or less. When the melting point of polyolefin exceeds 135° C., it takes a relatively long time from start of heat generation of the battery until start of the shutdown function. Accordingly, the overcharge resistance characteristics may deteriorate.

In addition, the melting point of polyolefin is set at 80° C. or more because the temperature of less than 80° fall within a range of the battery operating temperature. In other words, polyolefin having a melting point less than 80° C. may cause defects such as shrinkage of separator's pores even in the normal range of use.

[2] In the non-aqueous electrolyte secondary battery of [1] described above, the contact angle may be set at 30° or more and 60° or less. It is more preferable that the contact angle is larger from the viewpoint of suppressing permeation of polyolefin. The upper limit of the contact angle may be set at 60°, for example.

[3] In the non-aqueous electrolyte secondary battery of [1] describe above, it is preferable that the contact angle is 45° or more and 60° or less. This is because improvement in overcharge resistance characteristics can be expected.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An example of an embodiment of the present invention (hereinafter referred to as the "present embodiment") will be hereinafter described. However, the present embodiment is not limited to the following description. In the following description, a non-aqueous electrolyte secondary battery may be simply referred to as a "battery".

<Non-Aqueous Electrolyte Secondary Battery>

Figure 1:
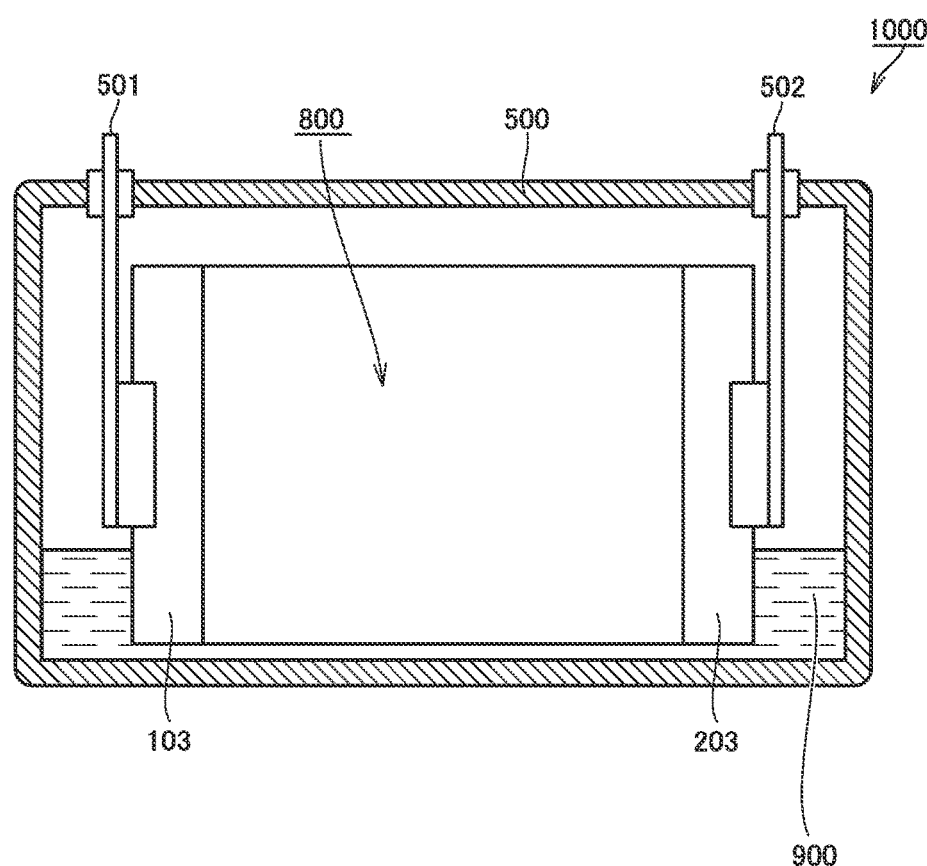
FIG. 1 is a schematic cross-sectional view showing an example of the configuration of a non-aqueous electrolyte secondary battery according to the present embodiment.

FIG. 1 is a schematic cross-sectional view showing an example of the configuration of a non-aqueous electrolyte secondary battery according to the present embodiment. A battery 1000 is a prismatic battery used, for example, in an in-vehicle application. Battery 1000 includes a prismatic battery case 500. Battery case 500 is made of an aluminum (Al) alloy, for example. Battery case 500 is typically formed of: a prismatic case body having a bottom: and a lid.

Battery case 500 is provided with a positive terminal 501 and a negative terminal 502 each serving as an external terminal. Battery case 500 may be provided with a liquid inlet port, a safety valve, a current interruption device, and the like. Battery case 500 houses an electrode assembly 800 and an electrolyte solution 900. Electrode assembly 800 is connected to positive terminal 501 and negative terminal 502. The electrolyte solution also permeates through electrode assembly 800.

<<Electrode Assembly>>

Figure 2:
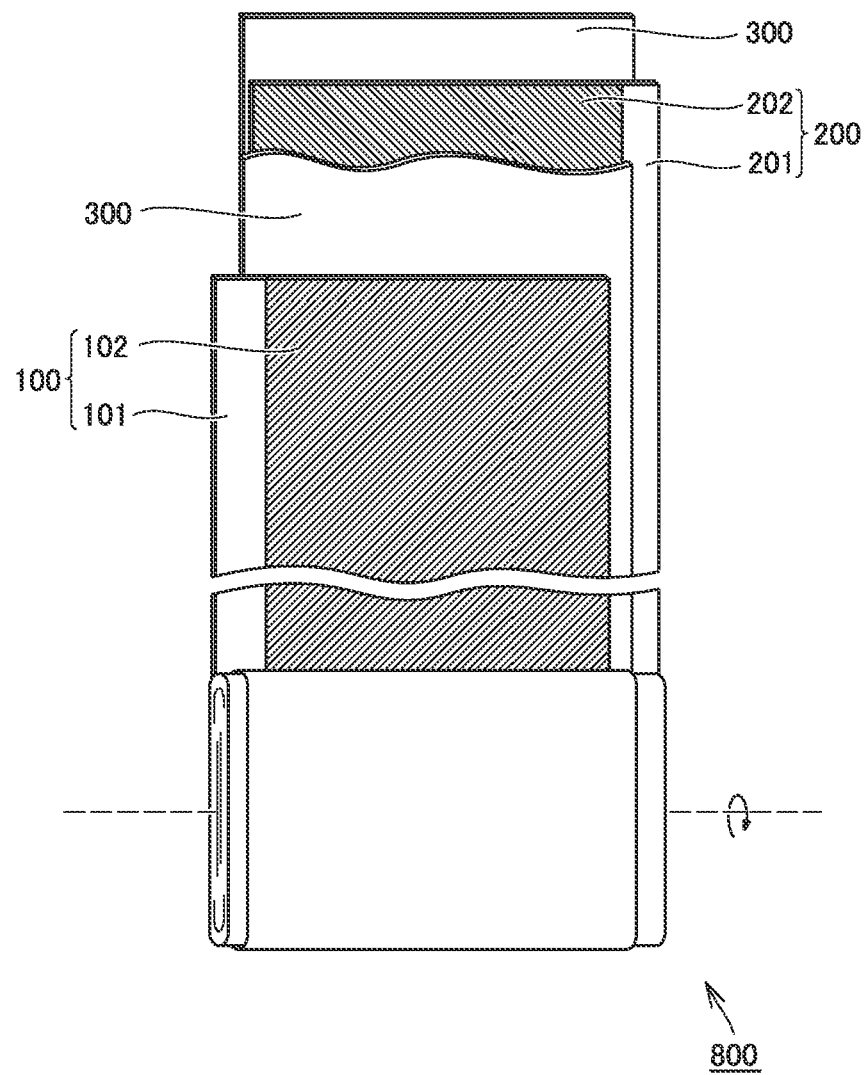
FIG. 2 is a schematic diagram showing an example of the configuration of an electrode assembly.

FIG. 2 is a schematic diagram showing an example of the configuration of an electrode assembly. Electrode assembly 800 is a winding-type electrode assembly. Electrode assembly 800 is formed of positive electrode plate 100, negative electrode plate 200 and separator 300, each of which is a strip-shaped sheet member. Electrode assembly 800 is formed by stacking positive electrode plate 100 and negative electrode plate 200 with separator 300 interposed therebetween and winding this stack. After electrode assembly 800 is wound, it is press-formed such that its outer shape is formed in a flat shape.

Figure 3:
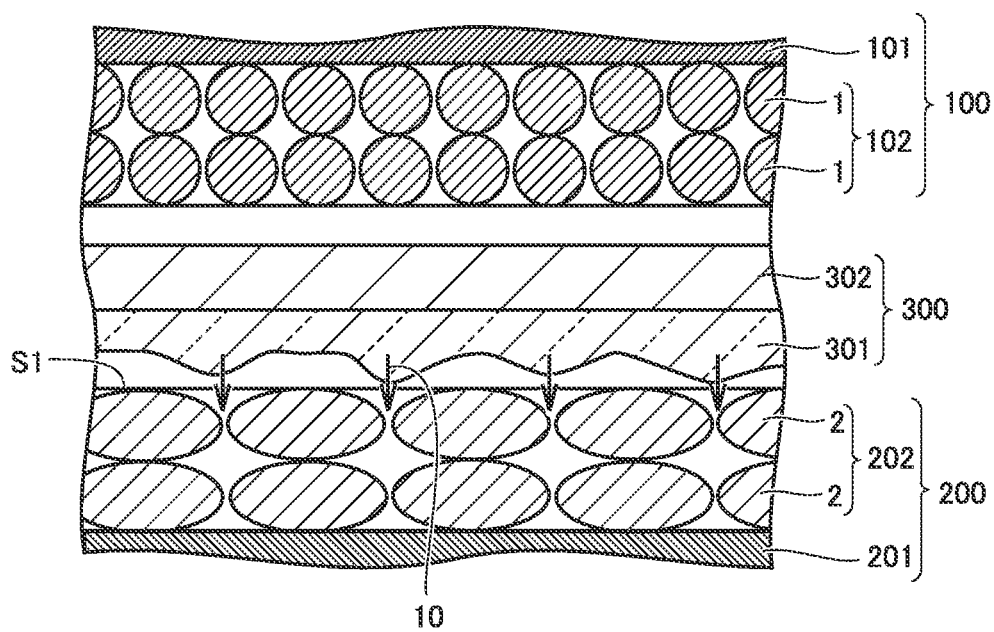
FIG. 3 is a schematic cross-sectional view showing an interface between an electrode plate and a separator.

FIG. 3 is a schematic cross-sectional view showing an interface between an electrode plate and a separator. As shown in FIG. 3, the non-aqueous electrolyte secondary battery of the present embodiment includes positive electrode plate 100, negative electrode plate 200, and separator 300 disposed between positive electrode plate 100 and negative electrode plate 200.

Positive electrode plate 100 includes a positive electrode collector 101 and a positive electrode mixture layer 102 containing positive electrode active material particles 1. The surface of positive electrode plate 100 is formed of positive electrode mixture layer 102. Positive electrode mixture layer 102 is a porous layer. This is because the positive electrode mixture layer containing a plurality of solid particles (positive electrode active material particles) cannot completely fill in cavities between particles.

Negative electrode plate 200 includes a negative electrode collector 201 and a negative electrode mixture layer 202 containing negative electrode active material particles 2. Negative electrode plate 200 has a surface S1 formed of negative electrode mixture layer 202. Negative electrode mixture layer 202 is a porous layer. This is because the negative electrode mixture layer contains a plurality of solid particles (negative electrode active material particles) like a positive electrode mixture layer.

Separator 300 includes a first porous resin layer 301 made of polyolefin having a melting point of 80° C. or more and 135° C. or less. At least one of positive electrode plate 100 and negative electrode plate 200 has a surface that faces first porous resin layer 301. FIG. 3 shows an embodiment in which negative electrode plate 200 has surface S1 that faces first porous resin layer 301 by way of example. Also in the example shown in FIG. 3, separator 300 also includes a second porous resin layer 302 made of polyolefin that has a melting point exceeding 135° C. Positive electrode plate 100 faces second porous resin layer 302.

An arrow 10 in FIG. 3 shows the direction in which molten first porous resin layer 301 permeates after a shutdown function occurs in the overcharge state. As shown by arrow 10, molten first porous resin layer 301 (polyolefin) permeates through an electrode plate (negative electrode plate 200 in FIG. 3) adjacent thereto. This is because negative electrode mixture layer 202 forming surface S1 of negative electrode plate 200 is a porous layer. In the example in FIG. 3, since second porous resin layer 302 has a relatively higher melting point, melting has not yet been started.

In the present embodiment, the electrode plate (negative electrode plate 200 in FIG. 3) has surface S1 facing a porous resin layer (first porous resin layer 301 in FIG. 3) made of polyolefin having a melting point of 80° C. or more and 135° C. or less. This surface S1 of the electrode plate forms a contact angle of 30° or more with a molten droplet of this polyolefin. In the case where each of the positive and negative electrode plates has a surface facing this porous resin layer, the surface of each of the positive and negative electrode plates forms a contact angle of 30° or more with a molten droplet of this polyolefin. This is not exclusively applied to the surface facing a porous resin layer (second porous resin layer 302) and the like, for example, having a melting point exceeding 135° C. as with the surface of positive electrode plate 100 shown in FIG. 3.

Surface S1 of negative electrode plate 200 forms a contact angle of 30° or more with the molten droplet of the polyolefin forming first porous resin layer 301, so that molten first porous resin layer 301 (molten polyolefin) is suppressed from permeating through negative electrode mixture layer 202. Thereby, polyolefin serving as an isolator is held between positive electrode plate 100 and negative electrode plate 200, thereby suppressing contact between positive electrode plate 100 and negative electrode plate 200.

It is more preferable that the contact angle is larger from the viewpoint of suppressing permeation of molten polyolefin. The contact angle is preferably 45° or more. Thereby, improvement in overcharge resistance characteristics can be expected. The upper limit of the contact angle is not necessarily limited. The upper limit of the contact angle may be set at 60°, for example. An explanation will be given later as to how the positive electrode plate or the negative electrode plate is formed so as to have a surface that hardly gets wet by molten polyolefin.

<<Method of Measuring Contact Angle>>

Figure 4:
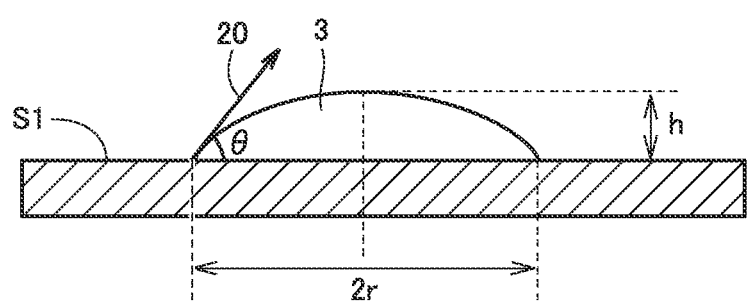
FIG. 4 is a schematic cross-sectional view illustrating a method of measuring a contact angle.

FIG. 4 is a schematic cross-sectional view illustrating a method of measuring a contact angle. The contact angle means an angle formed between the tangent line of a molten droplet and the surface of the electrode plate, which is formed when the molten droplet of polyolefin is dropped onto the surface of the electrode plate. It is to be noted that the angle formed in this case is an angle inside the molten droplet. In FIG. 4, the angle (θ) formed between a tangent line 20 of molten droplet 3 and surface S1 corresponds to a contact angle. The contact angle is calculated by a "θ/2 method". In other words, assuming that the shape of the molten droplet is as a part of a sphere, a radius (r) and a height (h) of the surface (surface S1) coming in contact with the molten droplet are measured, and the contact angle can be calculated by the following equation (i):

$$\theta = 2 \arctan(h/r) \quad (i)$$

The contact angle may be measured using a commercially-available contact angle meter. The contact angle meter may, for example, be "PG-X" (trade name) manufactured by MATSUBO Corporation, and the like. The contact angle is measured in an environment at a temperature of 150° C. The dropped amount of molten droplet is set at 0.1 g.

<<Separator>>

In the present embodiment, a separator is a member disposed between a positive electrode plate and a negative electrode plate.

The separator includes a porous resin layer. The porous resin layer has a thickness, for example, of about 2 μm to 30 μm, preferably about 2 μm to 20 μm, and more preferably about 2 μm to 15 μm. The porous resin layer is made of polyolefin having a melting point of 80° C. or more and 135° C. or less. Polyolefin may, for example, be polyethylene (PE), polypropylene (PP), and the like. Polyolefin is preferably low density polyethylene (LDPE), high density polyethylene (HDPE), and the like.

From the viewpoint of improving the sensitivity of the response to overcharge, the melting point of polyolefin is preferably 120° C. or lower, and more preferably 100° C. or lower. In this case, the melting point of the resin in the present specification shows a peak top temperature of the melting peak obtained in the differential scanning calorimetry (DSC) in accordance with the regulation defined in "JIS K 7121: 2012 Testing Methods for Transition Temperatures of Plastics".

The separator may be formed of a single porous resin layer or may be formed of a plurality of porous resin layers. When the separator includes a plurality of porous resin layers, this separator may include a porous resin layer having a melting point exceeding, for example, 135° C. as long as it includes at least one porous resin layer made of polyolefin having a melting point of 80° C. or more and 135° C. or less. Furthermore, the separator may include an inorganic porous layer, for example, nonwoven fabric made of resin fibers or an inorganic sintered body as long as it includes at least one porous resin layer.

An embodiment including a plurality of porous resin layers can be, for example, a configuration obtained by stacking a porous resin layer made of PE and a porous resin layer made of PP. The separator may have an inorganic filler layer containing inorganic fillers (for example, alumina particles and the like). Even if the separator includes an inorganic filler layer, the effect expected from the present embodiment is achieved. The entire thickness of the separator is, for example, about 2 μm to 50 μm, preferably about 2 μm to 20 μm, and more preferably about 2 μm to 15 μm.

The porous resin layer is manufactured, for example, by the stretching-opening method, the phase separation method or the like. The pore size, the porosity and the like of the porous resin layer may be suitably adjusted such that the air permeability of the separator achieves a desired value. The Gurley permeability of the separator only has to be set at about 100 to 400 sec/100 ml, for example. The Gurley permeability can be measured, for example, by a Gurley permeability tester and the like. The average pore size of the porous resin layer only has to be about 0.05 μm to 0.5 μm, for example. The average pore size can be measured, for example, by a mercury porosimetry and the like.

<<Positive Electrode Plate>>

Figure 5:
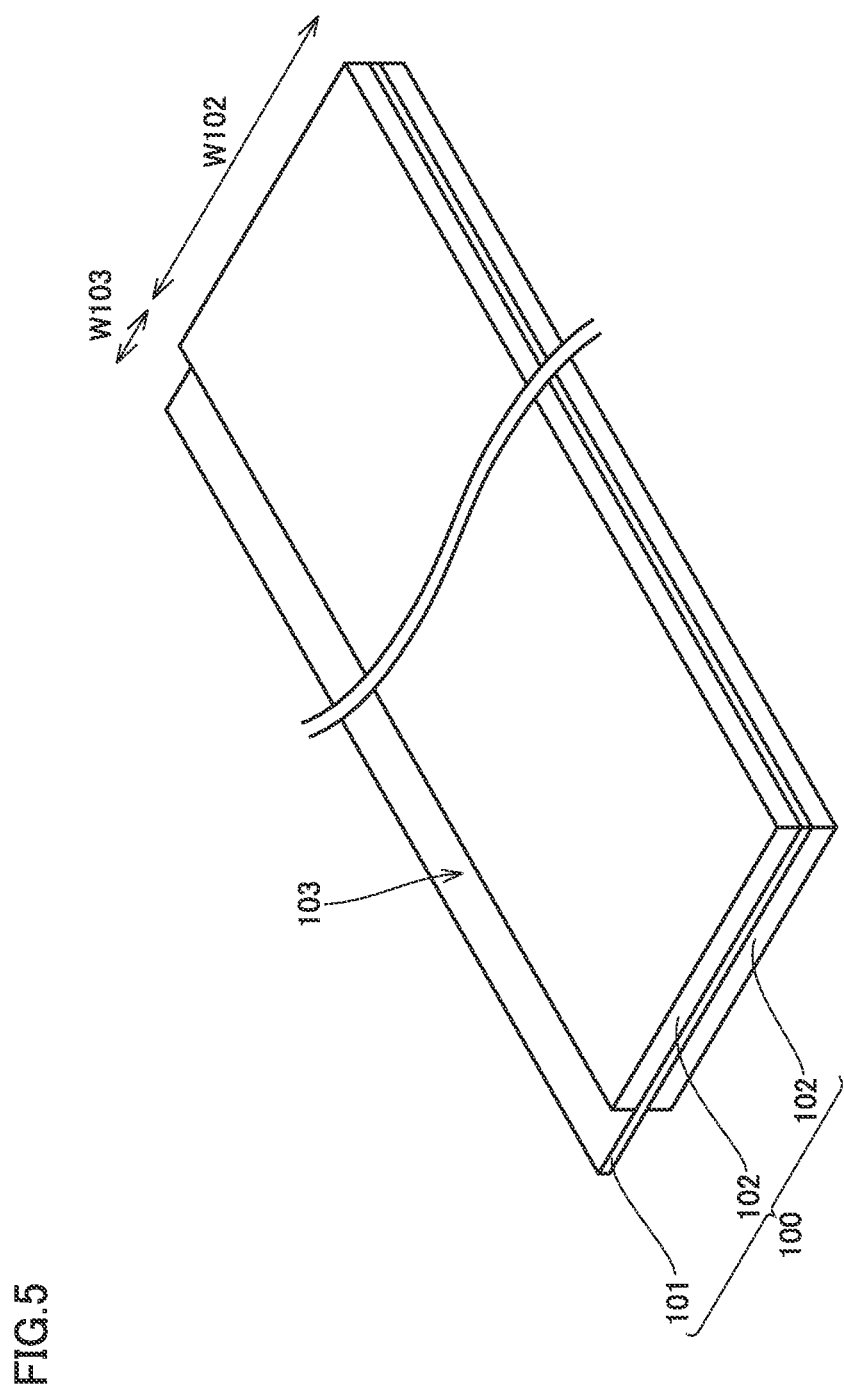
FIG. 5 is a schematic diagram showing an example of the configuration of a positive electrode plate.

FIG. 5 is a schematic diagram showing an example of the configuration of the positive electrode plate. Positive electrode plate 100 includes a positive electrode collector 101 and a positive electrode mixture layer 102 disposed on positive electrode collector 101. Positive electrode mixture layer 102 may be disposed on one of main surfaces of positive electrode collector 101 or may be disposed on both of the main surfaces. The positive electrode collector is, for example, an Al foil and the like. The positive electrode collector may have a thickness of about 5 μm to 25 μm, for example. A portion of positive electrode collector 101 that is exposed from positive electrode mixture layer 102 is defined as an exposed portion 103. This exposed portion 103 is provided in order to connect positive terminal 501 and electrode assembly 800 (see FIG. 1).

The thickness of the positive electrode mixture layer is about 20 μm to 100 μm, for example. The positive electrode mixture layer contains positive electrode active material particles and a binder resin. The positive electrode mixture layer contains about 80 mass % to 99 mass % of positive electrode active material particles, for example. The positive electrode active material particles are typically lithium (Li)-containing metal oxide particles. Li-containing metal oxide may have, for example, a layered rock-salt structure, a spinel-type structure, an olivine-type structure, and the like. The Li-containing metal oxide can, for example, be $LiCoO_2$, $LiNiO_2$, a compound expressed by the general formula $LiNi_aCo_bO_2$ (wherein a+b=1, 0<a<1, and 0<b<1), $LiMnO_2$, $LiMn_2O_4$, a compound expressed by the general formula $LiNi_aCo_bMn_cO_2$ (wherein a+b+c=1, 0<a<1, 0<b<1, and 0<c<1) (for example, $LiNi_{1/3}Co_{1/3}Mn_{1/3}O_2$ and the like), $LiFePO_4$, and the like. The average particle diameter of the positive electrode active material particles may, for example, be about 1 μm to 20 μm. The average particle diameter in the present specification in this case is assumed to show a particle size in 50% of a cumulative value (which is also referred to as "d50", a "median diameter" or the like) in the particle size distribution of the volume reference measured by the laser diffraction and scattering method.

The positive electrode mixture layer contains about 1 mass % to 20 mass % of binder resin, for example. It is preferable that the binder resin has a melting point higher than that of polyolefin forming a porous resin layer in the separator. This is for the purpose of increasing the contact angle with the molten droplet of polyolefin. Binder resin may, for example, be polyvinylidene difluoride (PVDF), polytetrafluoroethylene (PTFE), and the like. Alternatively, binder resin may be a copolymer made of: a monomer such as vinylidene fluoride (VDF) and tetrafluoroethylene (TFE); and other monomers. The monomer that can be copolymerized with VDF or TFE may, for example, be hexafluoropropylene (HFP), ethylene, perfluoro (alkyl vinyl ether), and the like. The copolymers may be an alternating copolymer, a random copolymer, a graft copolymer, a block copolymer, and the like. The binder resin may be used alone, or two or more types of binder resins may be used in combination.

The positive electrode mixture layer may contain a conducting material. The positive electrode mixture layer contains about 1 mass % to 10 mass % of a conducting material, for example. The conducting material may be carbon blacks such as acetylene black and thermal black, for example.

<<Negative Electrode Plate>>

Figure 6:
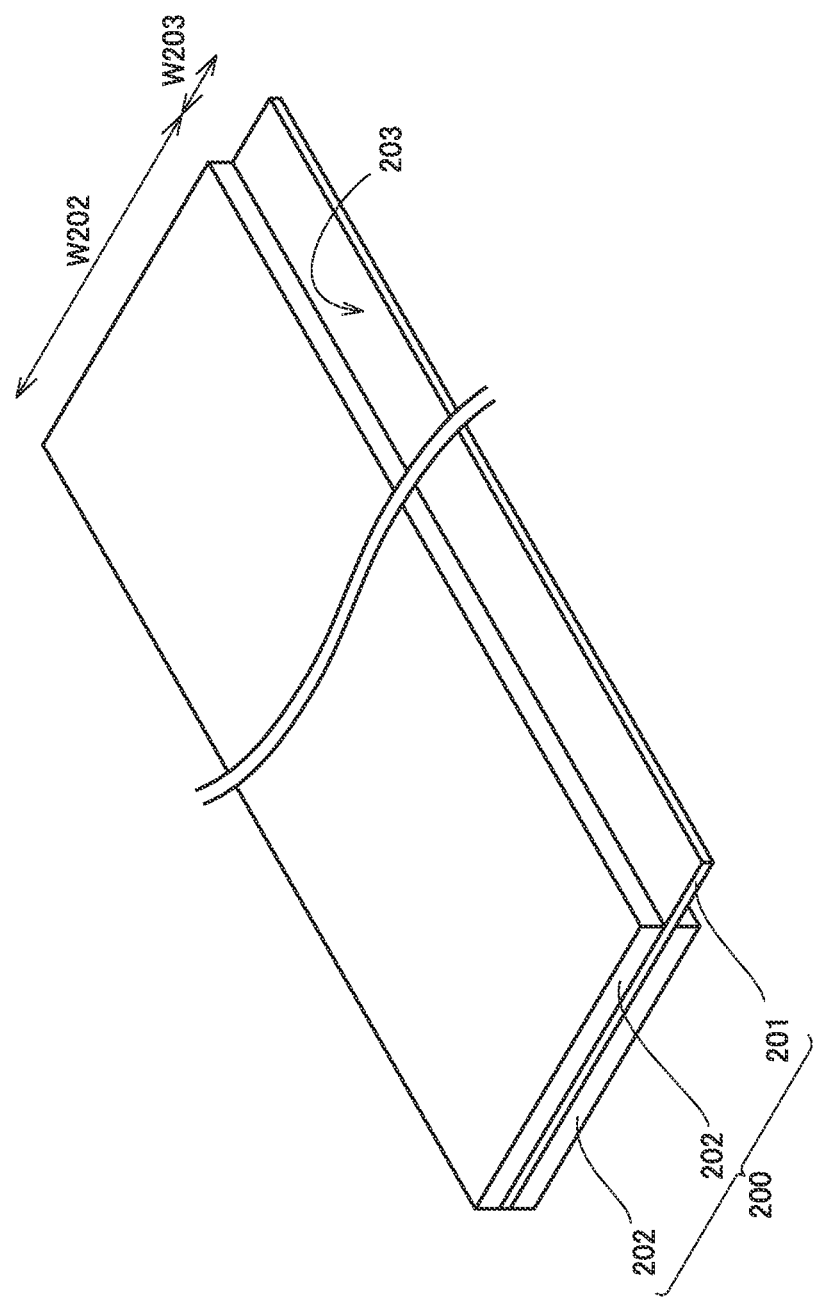
FIG. 6 is a schematic diagram showing an example of the configuration of a negative electrode plate.

FIG. 6 is a schematic diagram showing an example of the configuration of a negative electrode plate. Negative electrode plate 200 includes negative electrode collector 201 and negative electrode mixture layer 202 disposed on negative electrode collector 201. Negative electrode mixture layer 202 may be disposed on one of main surfaces of negative electrode collector 201, or may be disposed on both of the main surfaces. The negative electrode collector is, for example, a copper (Cu) foil and the like. The thickness of the negative electrode collector may be about 5 μm to 25 μm, for example. A portion of negative electrode collector 201 exposed from negative electrode mixture layer 202 is defined as an exposed portion 203. This exposed portion 203 is provided in order to connect negative terminal 502 and electrode assembly 800 (see FIG. 1).

The thickness of the negative electrode mixture layer is about 20 μm to 100 μm, for example. The negative electrode mixture layer contains negative electrode active material particles and a binder resin. The negative electrode mixture layer contains about 80 mass % to 99 mass % of negative electrode active material particles, for example. The negative electrode active material particles may be carbon-based negative electrode active material particles or may be alloy-based negative electrode active material particles. The carbon-based negative electrode active material may for example be graphite, soft (graphitizable) carbon, hard (hardly graphitizable) carbon, and the like. An alloy-based negative electrode active material may be silicon (Si), silicon oxide ($SiO_2$), tin (Sn), a tin-copper alloy (SnCu), and the like.

The negative electrode mixture layer contains about 1 mass % to 10 mass % of binder resin, for example. In addition to the binder resin exemplified in the description of the positive electrode mixture layer, the binder resin may be styrene butadiene rubber (SBR), acrylonitrile-butadiene rubber (NBR), carboxymethylcellulose sodium (CMC-Na), sodium polyacrylate (PAA-Na), and the like. The binder resin may be used alone, or two or more types of binder resins may be used in combination.

<<Configuration of Electrode Plate Forming Large Contact Angle with Molten Droplet of Polyolefin>>

The conceivable configuration of the electrode plate forming a relatively large contact angle with a molten droplet of polyolefin may be a configuration in which, for example, a binder resin is segregated to the surface side of the electrode mixture layer in the electrode mixture layer (a positive electrode mixture layer or a negative electrode mixture layer). The surface side used herein means the side opposite to the side on which an electrode collector (a positive electrode collector or a negative electrode collector) is located. A portion forming the surface of the electrode mixture layer contains preferably 8 mass % or more and 20 mass % or less of binder resin. Thereby, the contact angle between the molten droplet of polyolefin and the surface of the electrode plate can be set at 30° or more.

Alternatively, on the surface of the electrode mixture layer, an inorganic filler layer may be formed that contains preferably 8 mass % or more and 20 mass % or less of binder resin and contains an inorganic filler as the remainder. Even in such an inorganic filler layer, the cavity around the inorganic filler cannot be completely filled in. Consequently, this inorganic filler layer results in a porous layer.

(Granular Body)

When the above-mentioned inorganic filler is disposed on the surface of the electrode mixture layer, binder resin in the inorganic filler layer may permeate through the electrode mixture layer, thereby deteriorating the discharge performance. Also, the binder resin content in the electrode mixture layer ranging from 8 mass % to 20 mass % is relatively high. The binder resin is a resistance component. Accordingly, when the binder resin content is simply set at 8 mass % to 20 mass %, the discharge performance may deteriorate.

As a configuration of the electrode plate capable of forming a relatively large angle while suppressing deterioration in discharge performance, an electrode mixture layer formed of a granular body is conceivable. A granular body means a collection of granular particles. A granular particle means a composite particle obtained by granulating electrode active material particles (positive electrode active material particles or negative electrode active material particles) and a binder resin or the like. According to the present inventors' study, when the granular body formed particularly by a two-stage granulating operation is used, the contact angle formed at the surface of the electrode plate can be efficiently increased while suppressing deterioration in discharge performance.

Figure 7:
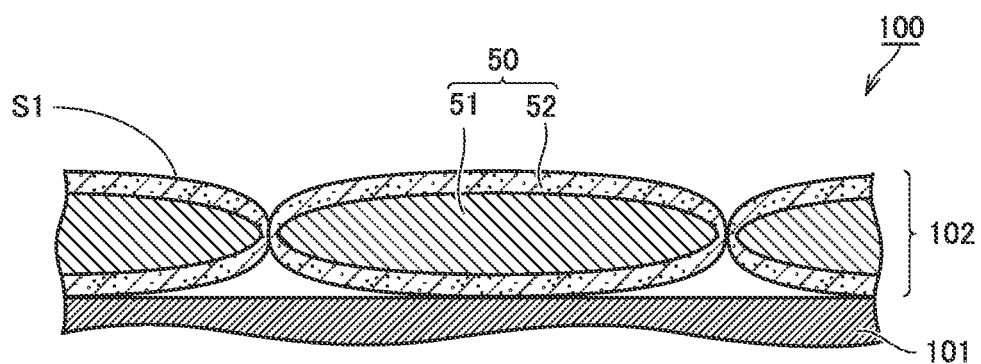
FIG. 7 is a schematic cross-sectional view showing an example of the electrode plate formed of a granular body.

FIG. 7 is a schematic cross-sectional view showing an example of the electrode plate formed of a granular body. FIG. 7 shows a positive electrode plate as an example. As a matter of course, a negative electrode plate can also be formed from a granular body. Positive electrode plate 100 includes positive electrode collector 101 and positive electrode mixture layer 102 disposed on positive electrode collector 101. Positive electrode mixture layer 102 contains a plurality of granular particles 50.

Granular particle 50 has a so-called core-shell structure. Specifically, granular particle 50 has a core-shell structure including a first granular portion 51 as a core and a second granular portion 52 as a shell. Second granular portion 52 forms surface S1 of positive electrode plate 100.

First granular portion 51 and second granular portion 52 contain positive electrode active material particles and a binder resin, respectively. For convenience, FIG. 7 does not show positive electrode active material particles and a binder resin. Second granular portion 52 contains preferably 8 mass % or more and 20 mass % or less of binder resin. First granular portion 51 contains a binder resin less than that of second granular portion 52. First granular portion 51 contains, for example, about 1 mass % to 4 mass % of binder resin (typically about 2 mass %).

According to the above-described configuration, the content of binder resin is increased locally on the surface of the electrode plate, so that the contact angle can be efficiently increased while suppressing deterioration in discharge performance. It is preferable that the ratio of the thickness of the second granular portion to the thickness of the electrode mixture layer is adjusted to about 1% to 30%, for example. It is to be noted that this ratio shows the percentage of the value obtained by dividing the thickness of the second granular portion by the thickness of the electrode mixture layer.

(Methods of Manufacturing Granular Body and Electrode Plate)

Then, a method of manufacturing a granular body and a method of manufacturing an electrode plate using the granular body will be hereinafter described.

1. Method of Manufacturing Granular Body

Figure 8:
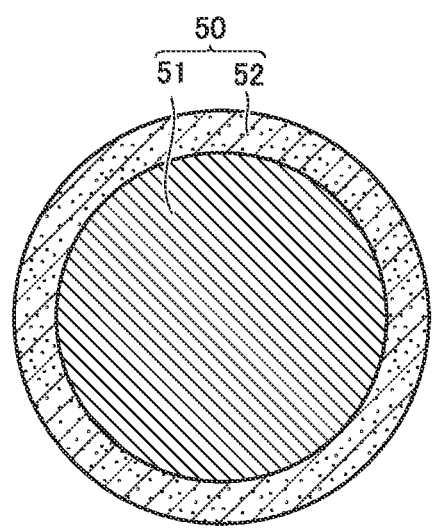
FIG. 8 is a schematic conceptual diagram showing an example of the configuration of a granular particle.

A granular body can be manufactured using an ordinary granulator. A granulating method may, for example, be agitation granulation, tumbling granulation, fluid-bed granulation, and the like. FIG. 8 is a schematic conceptual diagram showing an example of the configuration of a granular particle. In the present embodiment, a collection of granular particles 50 shown in FIG. 8, that is, a granular body, is manufactured preferably by a two-stage granulating operation.

1-1. Primary Granulating Operation

First, primary granular particles to be used as first granular portion 51 (core) are manufactured. Primary granular particles can be manufactured by granulating electrode active material particles, a binder resin, a solvent and the like introduced in a prescribed proportion into a granulation vessel of the granulator. The particle size of the primary granular particle may be about 0.1 mm to 5 mm, for example. Since the granular particles are extended thinly to form an electrode mixture layer, the particle size of each granular particle is adjusted greatly as compared with the thickness of the targeted electrode mixture layer.

1-2. Secondary Granulating Operation

Then, a granular particle 50 (a secondary granular particle) having a first granular portion 51 (core) and a second granular portion 52 (shell) adhering thereto is manufactured. Granular particles can be manufactured by granulating primary granular particles, electrode active material particles, a binder resin, a solvent and the like introduced in a prescribed proportion into a granulation vessel of the granulator. The electrode active material particles and the binder resin introduced at this stage are to form a second granular portion (shell). The content of binder resin in the second granular portion is set to be greater than the content of binder resin in the first granular portion.

Thereby, granular particle 50 shown in FIG. 8 can be manufactured. The particle size of the granular particle may for example be about 0.1 mm to 5 mm. In the present embodiment, the second granular portion only has to adhere to the first granular portion, but does not have to completely cover the first granular portion.

2. Method of Manufacturing Electrode Plate

Figure 9:
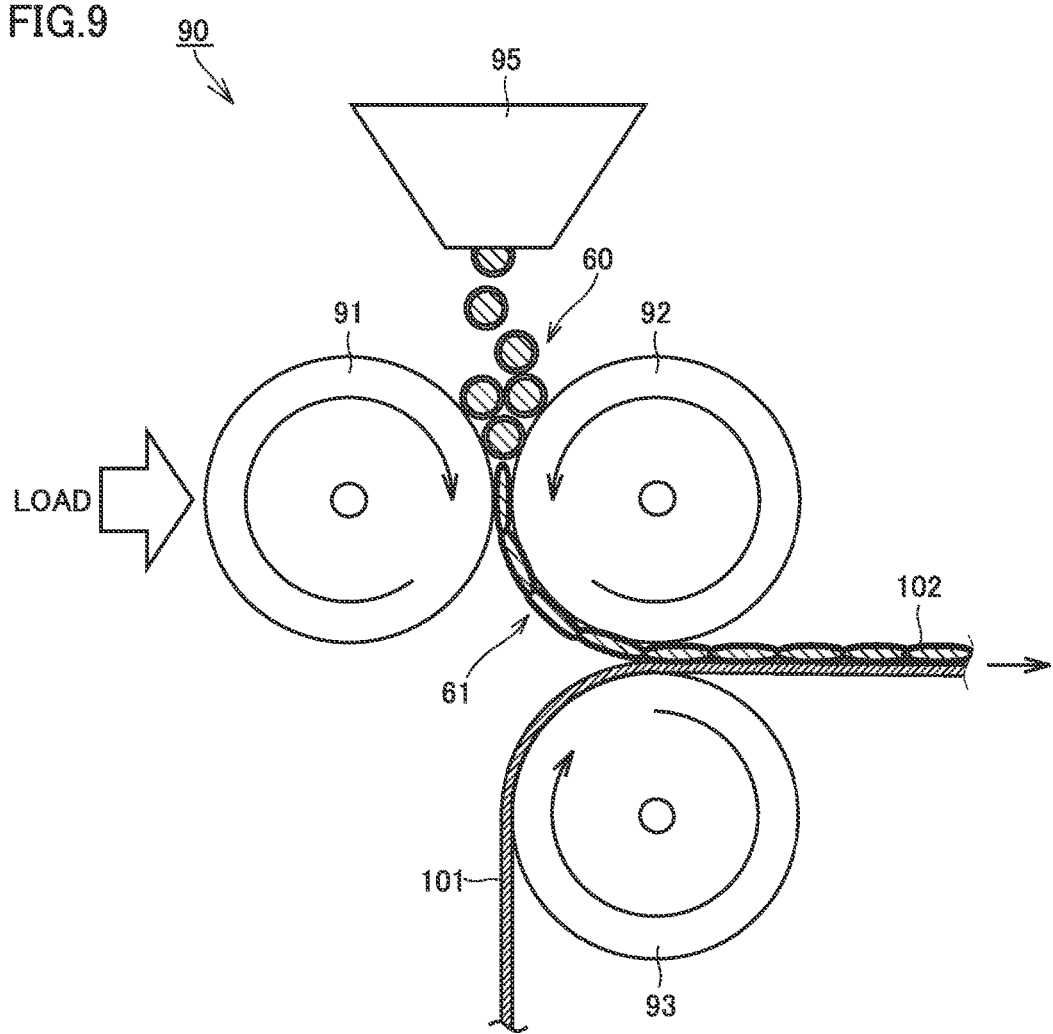
FIG. 9 is a schematic diagram showing an electrode manufacturing apparatus.

Then, a method of manufacturing an electrode plate using the granular body will be hereinafter described. FIG. 9 is a schematic diagram showing an example of the configuration of an electrode manufacturing apparatus. An electrode manufacturing apparatus 90 includes a feeder 95 and three rolls (an A roll 91, a B roll 92, and a C roll 93). The curved arrow shown on each roll indicates the rotation direction of each roll.

The granular body is supplied to feeder 95. Feeder 95 supplies granular body 60 into a gap between A roll 91 and B roll 92. A roll 91 is applied with prescribed load. The granular body is compacted in the gap between A roll 91 and B roll 92, and formed in a sheet shape. A coating weight (mass per unit area) of the granular body formed in a sheet shape can be adjusted by the gap between the rolls.

Then, granular body 61 formed in a sheet shape is arranged on an electrode collector. FIG. 9 shows positive electrode collector 101 as an electrode collector. As shown in FIG. 9, positive electrode collector 101 is conveyed on C roll 93 and supplied into the gap between B roll 92 and C roll 93. After granular body 61 passes through and out of the gap between A roll 91 and B roll 92, it is conveyed on B roll 92 and supplied into the gap between B roll 92 and C roll 93.

In the gap between B roll 92 and C roll 93, granular body 61 is pressed against positive electrode collector 101. Then, granular body 61 is separated from B roll 92 and pressure-bonded to positive electrode collector 101. In other words, the granular body is transferred onto the positive electrode collector. In this way, the granular body is disposed in a sheet shape on the electrode collector.

After the granular body is disposed on the electrode collector, a drying operation may be performed in order to allow volatilization of the solvent remaining in the granular body. The drying operation is performed, for example, in a hot air drying furnace (not shown) provided on a path line extending after C roll 93. Furthermore, the electrode collector having a granular body disposed on one of its surfaces is again supplied to C roll 93, so that the granular body can also be disposed on both surfaces of the electrode collector.

The granular body disposed on the electrode collector serves as an electrode mixture layer. Then, a compression operation may be performed in order to adjust the thickness and the density of the electrode mixture layer. The compression operation is performed, for example, using a roll rolling machine.

Lastly, the entire product is cut into a prescribed size, for example, using a slitter or the like, thereby completing a positive electrode plate 100 shown in FIG. 5, for example.

The configuration of the electrode plate forming a large contact angle with the molten droplet of polyolefin has been described above. The characteristics of the above-described configuration will be summarized as follows.

[4] The surface of the electrode plate facing the porous resin layer is formed of a porous layer containing 8 mass % or more and 20 mass % or less of binder resin.

The porous layer may be an inorganic filler layer disposed on the surface of the electrode mixture layer. The porous layer may be an electrode mixture layer (a positive electrode mixture layer or a negative electrode mixture layer) containing electrode active material particles (positive electrode active material particles or negative electrode active material particles).

[5] The electrode mixture layer contains a plurality of granular particles. A granular particle has a core-shell structure including the first granular portion as a core and the second granular portion as a shell. The first granular portion and the second granular portion contain electrode active material particles and a binder resin, respectively. The second granular portion contains 8 mass % or more and 20 mass % or less of binder resin. The first granular portion is less in content of binder resin than the second granular portion. The second granular portion forms a surface of the electrode plate that faces the porous resin layer.

<<Electrolyte Solution>>

An electrolyte solution is a liquid electrolyte obtained by dissolving lithium (Li) salt as a supporting electrolyte in an aprotic solvent. Examples of an aprotic solvent may, for example, be cyclic carbonates such as ethylene carbonate (EC), propylene carbonate (PC), butylene carbonate (BC) and γ-butyrolactone (γBL); and chain carbonates such as dimethyl carbonate (DMC), ethyl methyl carbonate (EMC), and diethyl carbonate (DEC). Two or more types of such aprotic solvents may be combined to obtain a mixed solvent. In the mixed solvent, the volume ratio between cyclic carbonates and chain carbonates may for example be set such that cyclic carbonates:chain carbonates=approximately 1:9 to 5:5. Such a range of the volume ratio can achieve an excellent balance between the electric conductivity and the electrochemical stability.

Examples of Li salt may be $LiPF_6$, $LiBF_4$, $LiClO_4$, $LiAsF_6$, $Li[(FSO_2)_2N]$ (abbreviated as "LiFSI"), $Li[(CF_3SO_2)_2N]$ (abbreviated as "LiTFSI"), $Li[CF_3SO_3]$, and the like. The electrolyte solution may contain two or more types of Li salts. The concentration of Li salt is, for example, about 0.5 mol/l (mole/liter) to 2.0 mol/l (typically about 0.8 mol/l to 1.2 mol/l).

The electrolyte solution may contain an additive agent in addition to the above-described ingredients. Examples of the additive agent may be Li salt including, as an anion, an oxalate complex such as $Li[(C_2O_4)_2B]$ (abbreviated as "LiBOB"), $Li[(C_2O_4)BF_2]$, $Li[(C_2O_4)_2PF_2]$; vinylene carbonate (VC), fluoro ethylene carbonate (FEC), ethylene sulfite (ES), propanesultone (PS), $Li[PO_2F_2]$, cyclohexylbenzene (CHB), biphenyl (BP), and the like.

In the present embodiment, a gel electrolyte or a solid electrolyte can also be used in place of an electrolyte solution (liquid electrolyte).

The present embodiment has been described as above with reference to a prismatic battery as an example. It is to be noted that the present embodiment is not limited to such a prismatic battery. The present embodiment may be applied to a cylindrical battery, a laminate-type battery, and the like. The electrode assembly is also not limited to a winding type. The electrode assembly may be provided also as a laminate type (also referred to as a "stack type"). The present embodiment is suitable to in-vehicle applications for which great importance is placed on overcharge resistance characteristics.

Examples

The present embodiment will be hereinafter described with reference to Examples. It is to be noted that the present embodiment is not limited to these Examples.

<Manufacture of Non-Aqueous Electrolyte Secondary Battery>

As described above, various non-aqueous electrolyte secondary batteries were manufactured, and overcharge resistance characteristics were evaluated.

<<No. 1>>

1. Manufacture of Positive Electrode Plate

The following materials were prepared.

Positive electrode active material particles: Lithium-containing layered nickel manganese cobalt composite oxide
 Conducting material: acetylene black
 Binder resin: PVDF
 Positive electrode collector: Al foil (thickness=20 μm)
 Solvent: NMP.

1-1. Primary Granulation

Positive electrode active material particles, a conducting material and a binder resin were introduced into a granulation vessel of the granulator so as to set a mass ratio such that positive electrode active material particles:conducting material:binder resin=90:8:2, to which a small amount of solvent was further added, and the primary granulation was performed. Thereby, a collection of primary granular particles acting as the first granular portion was obtained.

1-2. Secondary Granulation

The primary granular particles obtained as above, and positive electrode active material particles, conducting materials and a binder resin that act as the second granular portion were introduced into a granulation vessel of the granulator, to which a small amount of solvent was further added, and the secondary granulation was performed. The positive electrode active material particles, conducting materials and binder resin that act as the second granular portion were blended in a mass ratio of 84:8:8. As described above, a granular body as a collection of granular particles was obtained. This granular body includes granular particles each having a core-shell structure including the first granular portion as a core and the second granular portion as a shell.

1-3. Manufacture of Electrode Plate

Granular particles were supplied to an electrode manufacturing apparatus shown in FIG. 9, and a granular body was disposed in a sheet shape on the positive electrode collector as described above. The entire product obtained in this way was cut into a prescribed size, thereby obtaining a positive electrode plate 100 shown in FIG. 5. In positive electrode plate 100, the second granular portion containing 8 mass % of binder resin forms a surface of positive electrode mixture layer 102 (the surface of the positive electrode plate). The mass per unit area of positive electrode mixture layer 102 was set at 15 mg/cm². The dimensions of each part shown in FIG. 5 were set as described below.

Width of positive electrode mixture layer 102 (W102)=110 mm
 Width of exposed portion 103 (W103)=20 mm.

2. Manufacture of Negative Electrode Plate

The following materials were prepared.

Negative electrode active material particles: natural graphite particles
 Binder resin: PVDF
 Negative electrode collector: Cu foil (thickness=10 μm)
 Solvent: NMP.

2-1. Primary Granulation

Negative electrode active material particles and a binder resin were introduced into a granulation vessel of the granulator to achieve a mass ratio such that negative electrode active material particles:binder resin=98:2, to which a small amount of solvent was further added, and then, the primary granulation was performed. Thereby, a collection of primary granular particles acting as the first granular portion was obtained.

2-2. Secondary Granulation

The primary granular particles obtained as above, and negative electrode active material particles and a binder resin that act as the second granular portion were introduced into a granulation vessel of the granulator, to which a small amount of solvent was further added, and then, the secondary granulation was performed. The negative electrode active material particles and the binder resin that act as the second granular portion were blended in a mass ratio of 92:8. Thereby, a granular body as a collection of granular particles was obtained. This granular body includes granular particles each having a core-shell structure including the first granular portion as a core and the second granular portion as a shell.

2-3. Manufacture of Electrode Plate

Granular particles were supplied to the electrode manufacturing apparatus shown in FIG. 9, and a granular body was disposed in a sheet shape on the negative electrode collector as described above. The entire product obtained as described above was cut into a prescribed size, thereby obtaining a negative electrode plate 200 shown in FIG. 6. In negative electrode plate 200, the second granular portion containing 8 mass % of binder resin forms a surface of negative electrode mixture layer 202 (the surface of the negative electrode plate). The mass per unit area of negative electrode mixture layer 202 was set at 15 mg/cm². The dimensions of each part shown in FIG. 6 were set as below.

Width of negative electrode mixture layer 202 (W202)=115 mm

Width of exposed portion 203 (W203)=20 mm.

3. Manufacture of Electrode Assembly

A separator having a width of 120 mm and a thickness of 10 μm was prepared. The separator is formed of a single porous resin layer. The porous resin layer is made of PE (polyolefin) having a melting point of 135° C.

A winding device was used to stack a positive electrode plate and a negative electrode plate with a separator interposed therebetween, which were then wound. Thereby, a winding body formed in an elliptical shape was obtained. This winding body was press-formed in a flat shape using a flat-plate pressing machine. Thereby, an electrode assembly 800 shown in FIG. 2 was manufactured.

4. Assembly

A prismatic battery case (75 mm in length, 120 mm in width, 15 mm in depth, and 1 mm in thickness) was prepared. As shown in FIG. 1, exposed portion 103 and positive terminal 501 were connected, exposed portion 203 and negative terminal 502 were connected, and electrode assembly 800 was housed in battery case 500.

5. Supply of Solution

EC, EMC and DEC were mixed so as to achieve a volume ratio of EC:EMC:DEC=3:5:2, thereby preparing a mixed solvent. Furthermore, $LiPF_6$ was dissolved in this mixed solvent so as to set the concentration at 1M (1 mol/l), thereby preparing an electrolyte solution. The electrolyte solution was poured through a liquid inlet port of the battery case, and then, this liquid inlet port was sealed.

6. Initial Charge/Discharge

In an environment at a temperature of 25° C., the following charge and discharge cycle was performed to check the initial capacity (discharge capacity at the second cycle). The unit "C" of a current used herein shows a current by which the rated capacity of the battery is completely discharged in 1 hour. Furthermore, "CC" shows a constant current scheme, "CV" shows a constant voltage scheme, and "CC-CV" shows a constant current-constant voltage scheme.

(First Cycle)

CC charge: CC current=1C, cut voltage 4.2V

Rest: 5 minutes

CC discharge: CC current=1C, cut voltage 3.0V

Rest: 5 minutes.

(Second Cycle)

CC-CV charge: CC current=1C, CV voltage=4.1V, cut current=0.01C

CC-CV discharge: CC current=1C, CV voltage=3.0V, cut current=0.01C.

As described above, a non-aqueous electrolyte secondary battery (rated capacity=5 Ah) according to No. 1 was manufactured.

<<No. 2 to No. 14>>

As shown in Table 1, various separators were prepared, which were made of polyolefin (PE) having different melting points and forming a porous resin layer.

Furthermore, various positive and negative electrode plates were manufactured while changing the mass ratio of the binder resin in secondary granulation, such that these positive and negative electrode plates were different in content of binder resin on each surface of the electrode plates (the second granular portion), as shown in Table 1.

Various batteries were produced like No. 1 except for combining the above features as shown in Table 1. In Table 1, No. 1 to No. 8 are Examples and No. 9 to No. 14 are Comparative Examples.

TABLE 1

| No. | Separator Porous Resin Layer Melting Point of Polyolefin [° C.] | Surface of Positive Electrode Plate | | Surface of Negative Electrode Plate | | Overcharge Resistance Characteristics Attainment Voltage [V] |
|---|---|---|---|---|---|---|
| | | Binder Resin Content [Mass %] | Contact Angle [°] | Binder Resin Content [Mass %] | Contact Angle [°] | |
| 1 | 135 | 8 | 30 | 8 | 30 | 30 |
| 2 | 135 | 12 | 45 | 12 | 45 | 35 |
| 3 | 135 | 20 | 60 | 20 | 60 | 35 |
| 4 | 135 | 8 | 30 | 20 | 60 | 25 |
| 5 | 135 | 20 | 60 | 8 | 30 | 25 |
| 6 | 120 | 8 | 30 | 8 | 30 | 35 |
| 7 | 100 | 8 | 30 | 8 | 30 | 38 |
| 8 | 80 | 8 | 30 | 8 | 30 | 40 |
| 9 | 135 | 2 | 20 | 2 | 20 | 10 |
| 10 | 135 | 2 | 20 | 8 | 30 | 10 |
| 11 | 135 | 8 | 30 | 2 | 20 | 10 |
| 12 | 100 | 2 | 20 | 2 | 20 | 8 |
| 13 | 140 | 8 | 30 | 8 | 30 | 10 |
| 14 | 140 | 2 | 20 | 2 | 20 | 10 |

7. Evaluation 7-1. Measurement of Contact Angle

As described above, each contact angle between the molten droplet of PE forming each porous resin layer and each surface of the positive and negative electrode plates used for each battery was measured. The results thereof are shown in Table 1.

7-2. Overcharge Test

The overcharge resistance characteristics of the battery were evaluated by an overcharge test. The test conditions are as follows. First, in an environment at a temperature of 25° C., the SOC (State Of Charge) of the battery was adjusted to 100% by CC-CV charge (CC current=1C, CV voltage=4.1V, and cut current=0.01).

Constant voltage charge was performed at 8V. When the battery did not emit smoke, the voltage was raised by 1V, and constant voltage charge was performed at 9V. Similarly, while raising the voltage by 1V, the test was continued until the battery emitted smoke. In this test, the charge voltage was raised up to 40V. The test results are shown in Table 1. "Attainment Voltage" in Table 1 shows a charge voltage at the time when the battery emits smoke. In this test, the higher the "attainment voltage" is, the more the overcharge resistance characteristics are excellent.

<Results and Consideration>
<<No. 1 to No. 14>>

As to a battery satisfying the condition that the surface of the electrode plate facing a porous resin layer forms a contact angle of 30° or more with a molten droplet of polyolefin, Table 1 shows that this battery is higher in attainment voltage and more excellent in overcharge resistance characteristics than a battery not satisfying the above-mentioned conditions. The contact angle tends to be larger as the content of binder resin on the surface of the electrode plate (mixture layer) is greater.

<<No. 1 to No. 3 and No. 9>>

Figure 10:
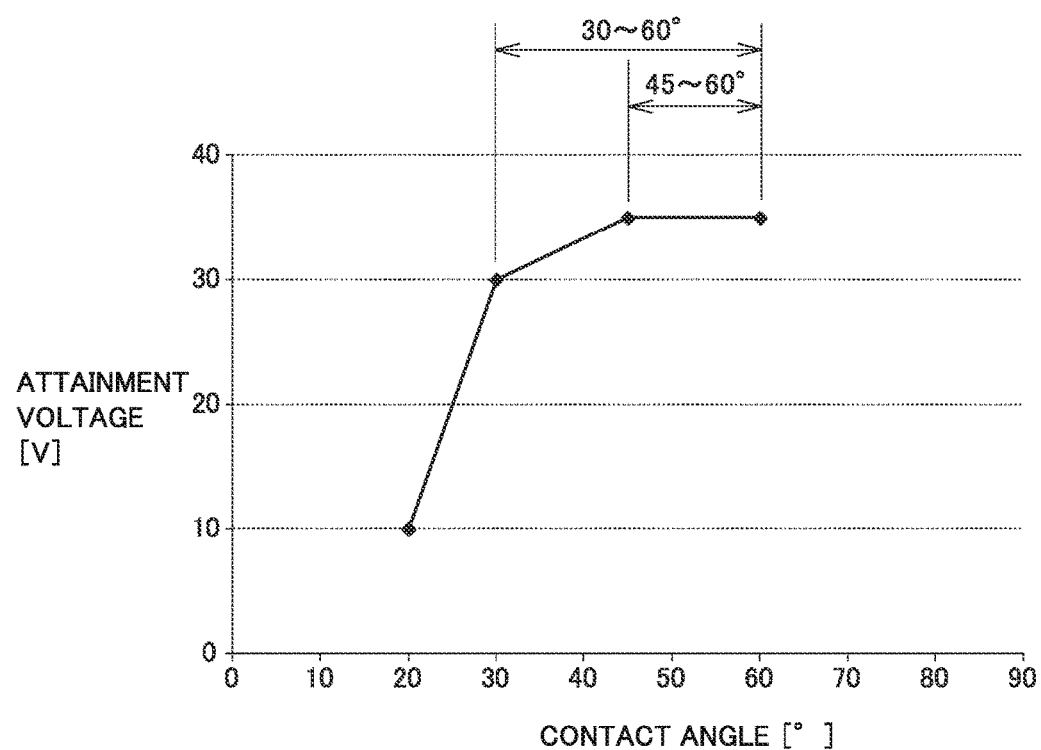
FIG. 10 is a graph showing the relation between the contact angle and the attainment voltage in an overcharge test.

FIG. 10 is a graph showing the relation between the contact angle and the attainment voltage. FIG. 10 shows a plot of the results obtained in No. 1 to No. 3 and No. 9 in Table 1.

FIG. 10 shows that the attainment voltage is remarkably improved when the contact angle is increased from 20° to 30°. In this experiment, an electrode plate forming a contact angle of 60° could be manufactured. Therefore, the upper limit of the contact angle may be 60°, for example. FIG. 10 shows that the overcharge resistance characteristics are particularly excellent when the contact angle falls within a range of 45° or more and 60° or less.

<<No. 1, No. 10 and No. 11>>

According to Table 1, No. 10 and No. 11 each exhibits a relatively low attainment voltage. In this experiment, both of a surface of the positive electrode plate and a surface of the negative electrode plate face the porous resin layer. In No. 10, the contact angle at the surface of the positive electrode plate is less than 30°. In No. 11, the contact angle at the surface of the negative electrode plate is less than 30°. In other words, these batteries each include a surface of the electrode plate that forms a contact angle of less than 30° with the molten droplet of polyolefin even though this surface faces the porous resin layer. In this case, it is considered that even if one of the electrode plates can suppress permeation of polyolefin, polyolefin permeates through the other electrode plate, with the result that the attainment voltage is not raised.

Therefore, among the positive and negative electrode plates, at least the electrode that faces a porous resin layer needs to have a surface forming a contact angle of 30° or more with the molten droplet of polyolefin (for example, see No. 1). In other words, in the case where both of the positive electrode plate and the negative electrode plate face the porous resin layer, these positive electrode plate and negative electrode plate each need to have a surface that forms a contact angle of 30° or more with the molten droplet of polyolefin.

<<No. 1, No. 6 to No. 8, and No. 13>>

Figure 11:
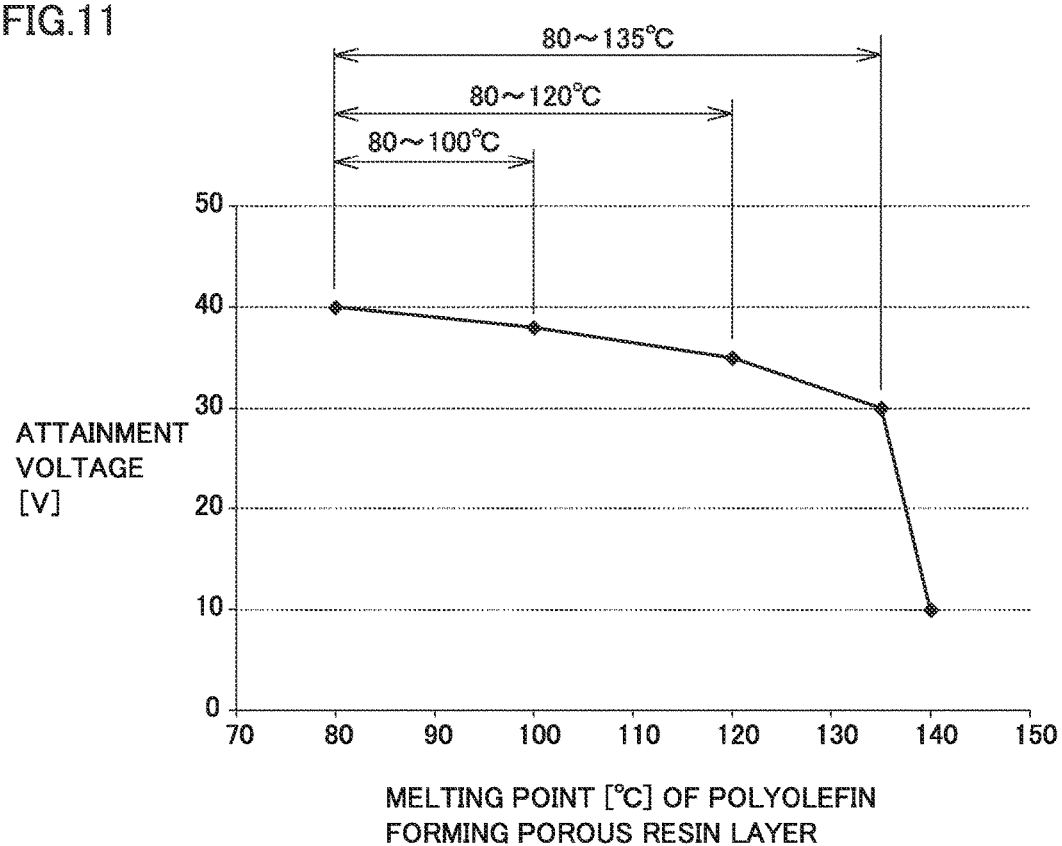
FIG. 11 is a graph showing the relation between the melting point of polyolefin forming a porous resin layer and the attainment voltage in the overcharge test.

FIG. 11 is a graph showing the relation between the melting point of polyolefin and the attainment voltage. FIG. 11 shows a plot of the results obtained in No. 1, No. 6 to No. 8, and No. 13 in Table 1. According to FIG. 11, when the melting point rises from 135° C. to 140° C., the withstand voltage significantly deteriorates. It is considered, when the melting point exceeds 135° C., the response of the porous resin layer to heat generation of the battery in the early overcharge stage (that is, shutdown) is delayed, so that the overcharge resistance characteristics deteriorates. According to FIG. 11, it is considered that the melting point of polyolefin is preferably 80° C. or more and 120° or less, and more preferably 80° C. or more and 100° C. or less.

<<No. 9, No. 12 and No. 14>>

In the configuration in which the contact angle at the surface of the electrode plate is less than 30°, the overcharge resistance characteristics rather deteriorate when the melting point of polyolefin is lowered. It is considered this is because, in the configuration in which molten polyolefin is more likely to permeates through the electrode plate, polyolefin becomes further more likely to melt, so that the permeation amount of polyolefin increases.

Although the embodiments of the present invention have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A non-aqueous electrolyte secondary battery comprising:
   a positive electrode plate;
   a negative electrode plate; and
   a separator disposed between the positive electrode plate and the negative electrode plate,
   the separator including a porous resin layer,
   the porous resin layer being made of polyolefin having a melting point of 80° C. or more and 135° C. or less,
   at least one of the positive electrode plate and the negative electrode plate having a surface layer that faces the porous resin layer, and
   the surface layer having a contact angle of 30° or more,
   wherein the contact angle indicates an angle formed between a tangent line of a molten droplet of the polyolefin and the surface layer when 0.1 g of the polyolefin is dropped onto the surface layer,
   at least one of the positive electrode plate and the negative electrode plate contain a plurality of granular particles,
   each of the granular particles has a core-shell structure including a first granular portion as a core and a second granular portion as a shell,
   the surface layer comprises the second granular portion,
   the first granular portion contains 1 mass % or more and 4 mass % or less of a first binder resin based on a total mass of the first granular portion, and a plurality of solid particles as the remainder, and
   the second granular portion contains 8 mass % or more and 20 mass % or less of a second binder resin based on a total mass of the second granular portion, and a plurality of solid particles as the remainder.

2. The non-aqueous electrolyte secondary battery according to claim 1, wherein the contact angle is 30° or more and 60° or less.

3. The non-aqueous electrolyte secondary battery according to claim 2, wherein the contact angle is 45° or more and 60° or less.

4. The non-aqueous electrolyte secondary battery according to claim 1, wherein the first binder resin and the second binder resin are the same binder resin.

* * * * *